United States Patent
Krallmann et al.

(10) Patent No.: US 7,022,357 B2
(45) Date of Patent: Apr. 4, 2006

(54) PROCESS FOR THE PREPARATION OF SMOKE-IMPREGNATED TUBULAR CASINGS

(75) Inventors: Anton Krallmann, Fallingbostel (DE); Kai Warkentin, Soltau (DE)

(73) Assignee: Wolf Walsrode AG, Walsrode (DE)

( * ) Notice: Subject to any disclaimer, the term of this patent is extended or adjusted under 35 U.S.C. 154(b) by 318 days.

(21) Appl. No.: 10/146,323

(22) Filed: May 15, 2002

(65) Prior Publication Data

US 2003/0059502 A1  Mar. 27, 2003

(30) Foreign Application Priority Data

May 21, 2001  (DE)  ................. 101 24 581

(51) Int. Cl.
*A22C 13/02*  (2006.01)
(52) U.S. Cl. .................. 426/92; 426/105; 426/135; 426/307; 452/27
(58) Field of Classification Search ................ 426/92, 426/105, 135, 302, 307; 452/27, 35
See application file for complete search history.

(56) References Cited

U.S. PATENT DOCUMENTS

| 4,196,220 A | * | 4/1980 | Chiu et al. ................. 426/105 |
| 4,354,295 A | | 10/1982 | Kollross ....................... 17/1 R |
| 5,425,974 A | * | 6/1995 | von Widdern et al. ...... 428/35.4 |
| 5,612,104 A | | 3/1997 | Grund ......................... 428/348 |
| 5,690,977 A | * | 11/1997 | Hammer et al. ............ 426/105 |
| 6,660,315 B1 | * | 12/2003 | Miller et al. ................. 426/105 |

FOREIGN PATENT DOCUMENTS

| CA | 1235018 | 4/1988 |
| DE | 198 18 358 | 10/1999 |
| EP | 884 951 | 11/2001 |

* cited by examiner

*Primary Examiner*—Drew Becker
(74) *Attorney, Agent, or Firm*—Joseph C. Gil; James R. Franks

(57) ABSTRACT

A method of preparing smoke-impregnated tubular casings is described. The process comprises: (a) providing a tubular casing having interior and exterior surfaces, the tubular casing being selected from cellulose fiber tubular casings and synthetic tubular casings, and the tubular casing being suitable for encasing food fillings having a form selected from one of liquid and paste; (b) applying to the interior surface of the tubular casing a mixture comprising, (i) liquid smoke, (ii) browning agents, and (iii) optionally water; (c) allowing the mixture to remain in contact with the interior surface of the tubular casing for at least 5 days; and (d) optionally shirring and watering the mixture treated casing. The smoke-impregnated tubular casings prepared in accordance with the method of the present invention are suitable for liquid or paste-like food fillings, such as sausagemeat emulsions.

5 Claims, No Drawings

PROCESS FOR THE PREPARATION OF SMOKE-IMPREGNATED TUBULAR CASINGS

CROSS REFERENCE TO RELATED PATENT APPLICATION

The present patent application claims the right of priority under 35 U.S.C. §119 (a)–(d) of German Patent Application No. 101 24 581.5, filed May 21, 2001.

FIELD OF THE INVENTION

The present invention relates to a process for the preparation of smoke-impregnated tubular casings, e.g., tubular cellulose fiber casings or tubular plastic (or synthetic) casings. The process comprises applying a mixture of liquid smoke, browning agents and optionally water to the interior surface of the tubular casing. The mixture is allowed to remain in contact with the interior surface of the tubular casing for at least five (5) days. The tubular casings of the present invention may be used for encasing liquid or paste-type food fillings, e.g., sausagemeat emulsions.

BACKGROUND OF THE INVENTION

In the industrial production of scalded-emulsion sausage and cooked-meat sausage, in addition to cellulose fiber casings, multilayer biaxially oriented plastic casings based on polyamide (PA) and in combination with other plastics have proved themselves in many aspects for years.

Biaxial orientation is understood by those skilled in the art to be transverse and longitudinal stretching of the thermoplastic extrudate at temperatures between the glass transition temperature and melting temperature of the polymeric materials. Biaxial orientation is customarily performed using a bubble filled with a gas or fluid pressure cushion, which bubble is enclosed gas-tightly or fluid-tightly between two roller pairs running at different speeds. During the stretching the molecules of the film tube in the solid state orientate themselves in such a manner that the modulus of elasticity and the strengths both in the transverse and in the longitudinal directions are increased to a considerable extent. Following the stretching there usually follows a further temperature treatment.

DE-A 43 39 337 describes a five-layer biaxially oriented tubular film for packaging and encasing foods. This casing is characterized in that it is made up of an inner and outer layer made of the same polyamide material and a middle polyolefin layer and also two bonding agent layers consisting of the same material.

EP-A 530 538 describes a five-layer coextruded biaxially oriented tubular film having at least three polyamide layers, polymer layers of water-barrier and oxygen-barrier character being incorporated between the inner and outer polyamide layers.

DE-A 198 18 358, for example, discloses spraying synthetic casings from the inside with a wax which acts at ambient temperature as bonding agent between the casing inner surface and the smoke concentrate, and a smoke concentrate, before shirring, in one operation. When the sausages are scalded, the wax is intended to give up its bonding agent function and thus release the smoke concentrate for transfer into the sausagemeat emulsion mixture. The disadvantage of this process is the reproducibility of the process which is difficult to establish and the additional use of waxes for the sausage industry.

EP-A 0 884 951 describes a process in which a smoke concentrate is applied with a liquid coating to the inside of the film used not just before the packaging of food, in particular sausage. A disadvantage here is considered to be the uneven amount of smoke concentrate applied.

For the meat-processing industry, it is of particular interest to process, for example, the abovementioned tubular casings with high efficiency. For this reason, the tubular casings are typically subjected to a shirring process in which, using a shirring mandrel, they are laid into pleats to form a shirred stick, so that the length of the shirred stick is drastically reduced. The shirring of tubular materials is known, as described in, for example, DE-A 8 944 623 C2.

The flexibility of polyamide casings in the dry state is not sufficient for product stuffing without creasing, in order still, after the cooking or scalding process, to deliver sufficient shrink properties of the casing so that a smooth crease-free sausage is formed.

For this reason, the polyamide-containing tube, shortly before stuffing with meat or with sausage, is immersed and/or watered in cold and also hot water. This procedure is described, inter alia, in DE-A 3 426 723.

According to the prior art described herein, production of smoke-impregnated, ready-to-stuff conditioned multilayer plastic casings is burdened with disadvantages.

SUMMARY OF THE INVENTION

It was therefore an object to produce a smoke-impregnated at least three-layer tubular film, in particular one having a polyamide inner layer, that gives the finished sausage a smoke flavor.

This object has been achieved by providing an inventively produced casing which can be delivered, optionally biaxially oriented, in a multilayer form that is shrinkable, and which has been smoke-impregnated by means of applying a mixture comprising a liquid smoke emulsion onto the inner surface of the casing.

In accordance with the present invention, there is provided a process of preparing a smoke-impregnated tubular casing comprising:

(a) providing a tubular casing having interior and exterior surfaces, said tubular casing being selected from cellulose fiber tubular casings and synthetic tubular casings, and said tubular casing being suitable for encasing food fillings having a form selected from one of liquid and paste;

(b) applying to the interior surface of said tubular casing a mixture comprising,
   (i) liquid smoke,
   (ii) browning agents, and
   (iii) optionally water;

(c) allowing said mixture to remain in contact with the interior surface of said tubular casing for at least 5 days (e.g., from 5 to 10 days); and (d) optionally shirring and watering the mixture treated casing.

Unless otherwise indicated, all numbers expressing quantities of ingredients, reaction conditions, etc. used in the specification and claims are to be under stood as modified in all instance by the term "about."

DETAILED DESCRIPTION OF THE INVENTION

The tubular casing can be made of cellulose fiber casing with or without a barrier layer against water and optionally against oxygen.

In an embodiment of the present invention, the tubular casing is a cellulose fiber tubular casing, which comprises a water-barrier layer and optionally a PVDF oxygen-barrier layer.

Preferably, the inventive process is a process for producing a smoke-impregnated synthetic casing having an outer layer and inner layer each made of polyamide and a middle layer (interposed between the outer and inner polyamide layers). The middle layer has water-barrier properties and optionally oxygen-barrier properties made. The middle layer comprises polyethylene or ethylene-vinyl alcohol. A mixture comprising liquid smoke, browning agents and optionally water is applied to the inner layer of the tubular film before shirring. The mixture is allowed to act on (or stay in contact with) the inside layer for a period of at least 5 days. After treatment with the mixture, the plastic casing may optionally be shirred and treated with water before stuffing.

Surprisingly, it has been found in the application-oriented experiments (described further herein), that tubular casings prepared according to the invention, in which the interior surface of the casing is treated with a particular mixture of liquid smoke and browning agent and optionally water, a smoke-impregnated tubular casing is obtained that has particularly desirable properties, such as increased depth of smoke flavor penetration into the meat contained therein.

The mixture that is applied to the inner layer (or surface) in the method of the present invention, preferably comprises: (i) a natural smoke flavoring as liquid smoke, for example 10–50% Smokez Einviro® 9033, manufacturer Red Arrow, which is produced from freshly produced smoke from natural hardwoods, having a pH of approximately 6, a smoke flavor content of 14–18 mg/ml and a carbonyl content of 15–19%; (ii) 20–60% of a browning agent, a natural flavoring, for example Smokez® MB12, manufacturer Red Arrow, which is produced by heat treatment of food hydrocarbons; and (iii) optionally a water content of 0–70% . The percentages being by weight based on the total weight of the mixture.

Examples of treatment mixtures, and components thereof, that may be used in the method of the present invention are summarized in the following table.

The mixtures are typically applied using the art-recognized bubble technique to the interior surface of the tubular casing at a content of 5–8% by weight (i.e., the tubular casing has a weight increase of from 5–8 wt. % after treatment with the mixture).

In a further embodiment, the smoke emulsion can be applied to the interior surface of the tubular casing, while a spray agent is concurrently applied to the exterior surface of the casing. The spray moistening is carried out in such a manner that the spray medium is in the form of a water-in-oil emulsion. This emulsion may optionally comprise (i) a fungicide, for example quaternary ammonium chloride compounds (trade name Sokrena®, manufacturer: Bode Chemie), and/or (ii) a preservative (for example sodium salts, manufacturer: Merck).

The water-in-oil emulsion is typically applied to both sides of the flattened casing during passage through a rewinding machine, for example from Kuko or Eichel. The amount of spray medium applied is set so that at most the saturation limit of the outer polyamide layers is achieved.

After storing a mixture filled tubular casing in a 100 μm polyethylene bag for a period of at least 5 days, e.g., 7 days, the smoke emulsion at least partially penetrates the casing from the inside.

The smoke-impregnated cellulose fiber tubular casings and synthetic tubular casings produced in accordance with the present invention are particularly suitable as casings for cooked-meat sausage or scalded-emulsion sausage. Smoke-impregnated tubular casings produced in accordance with the method of the present invention can be used to produce smoke-flavored sausage without the use of a smoking chamber.

The invention further relates to the use of the above-described mixture of liquid smoke, browning agent and optionally water for smoke impregnating tubular casings for encasing food fillings packaged in the pasty or liquid state, in particular sausagemeat emulsion.

EXAMPLES

The tests were carried out in the fabrication sector and also in application technology with the following examples.

The examples and comparative examples are intended to explain the invention mentioned according to the claims.

The aliphatic polyamide used for the casings is may be selected from, for example, linear polyamide (PA), nylon 6, nylon 66, nylon 11, nylon 12, and/or linear copolyamide nylon 6.66, nylon 4.6, nylon 6.6, nylon 6.8, nylon 6.9, nylon 6.10, nylon 6.11, nylon 6.12 or a mixture of the abovementioned polyamides or copolyamides. Proportions of aromatic polyamide or partially aromatic polyamide can be added to the polyamide in order to improve, for example, the processing or barrier properties of the casing.

For the water-barrier layers, polyolefins having water-vapor-barrier characteristics can be used, for example polyethylene or polypropylenes or polybutenes or their copolymers, which are end-group-modified, for example, to achieve improved molding adhesion, or ionomeric polymers, such as Zn ionomers of ethylene-acrylic acid copolymers.

The casings can, in addition to the water-barrier layer, include a further layer having oxygen-barrier properties, in order to reduce greying effects and to increase the storage

| Component | Function | Trade name | Smoke flavor content | Carbonyl content | pH | Total acidity | Produced from | Proportion in the mixture % |
|---|---|---|---|---|---|---|---|---|
| (i) | Smoke aroma (liquid smoke) | Enviro 9033 | 14–18 mg/ml | 15–19% | 6 | | Natural hardwoods | 10–50 |
| (ii) | 1. Browning agent | SmokEz MB12 | 12% | | 2.5–3 | 0.5% | Controlled heat treatment of food hydrocarbons | 20–60 |
| (iii) | Water | | | | | | | 0–70 | time of the finished sausages. The oxygen-barrier layers can consist of saponified ethylene vinylacetate or mixtures thereof with other polymers.

The various polymers used in casings prepared according to the present invention and in the comparative examples are abbreviated as follows.

| PA | Nylon 6 | for example: Durethan B 40 F (Bayer AG) |
| PO-HV | Propylene-based copolymer bonding agent | for example: Bynel E 379 (Du Pont) |
| XX | Ethylene-vinylalcohol copolymer | for example: EVAL LC F 101 BZ (Kuraray) |
| APA | Partially aromatic copolyamide | for example: Selar PA 3426 (Du Pont) |
| MB | Masterbatch | for example: colour masterbatch PA gold |

In addition, for the polymers used, some tradenames and the manufacturers are listed by way of example.

Tests:

Depth of penetration of the smoke flavor in the sausage-meat emulsion

The depth of penetration of smoke flavor in the sausage-meat emulsion denotes the depth measured from the outer diameter of the emulsion to the depth at which smoke flavor can no longer be perceived.

Intensity of sausage flavor:

The intensity of the sausage flavor may only be compared with unsmoked sausage.

Example 1 (E1)

The commercial product Walsroder® K plus SK nominal calibre 60 mm (from Wolff Walsrode A G, Walsrode), according to the invention, absorbed 8% of the abovementioned mixture as total weight increase, using the bubble method. After a waiting time of 7 days, the casing was shirred using an axial shirring machine. In accordance with the manufacturer's instructions, it was treated with water (for example 30 minutes in hand-hot water) and stuffed.

Comparative Example 1.1. (CE1.1)

The casing used in Example 1 was shirred after a waiting time of 1 day.

In accordance with the manufacturer's instructions, it was treated with water (for example 30 minutes in hand-hot water) and stuffed.

Example 2 (E2)

The commercial product Walsroder® K flex nominal calibre 60 mm (from Wolff Walsrode AG, Walsrode), according to the invention, absorbed 10% of the abovementioned mixture from the inside using the bubble technique as total weight increase. After a waiting time of 7 days, the casing was shirred on an axial shirring machine. In accordance with the manufacturer's instructions, it was treated with water (for example 30 minutes in hand-hot water) and stuffed.

Comparative Example 2 (CE2)

The casing used in Example 2 was shirred after a waiting time of 1 day.

In accordance with the manufacturer's instructions, it was treated with water (for example 30 minutes in hand-hot water) and stuffed.

The result of the tests is compiled in the table below:

| Sample | | E1 | CE1.1 | E2 | CE2 |
|---|---|---|---|---|---|
| Nominal caliber | | 60 | 60 | 60 | 60 |
| Depth of penetration of smoke flavor in the emulsion | mm | 10 | 0.5 | 10 | 0.5 |
| Intensity of smoke flavor of the emulsion | Score* | 1 | 3 | 1 | 4 |

*1 = very good; 4 = bad, 3 = good

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process of preparing a smoke-impregnated tubular casing comprising:
   (a) providing a tubular casing having interior and exterior surfaces, said tubular casing being suitable for encasing food fillings having a form selected from one of liquid and paste, and said tubular casing being a synthetic tubular casing comprising an outer polyamide layer, an inner polyamide layer, and a middle layer comprising one of an ethylene-vinyl alcohol copolymer and a propylene-based copolymer, said middle layer being interposed between said outer and inner layers, and said middle layer having water-barrier properties and optionally oxygen-barrier properties;
   (b) applying to the interior surface of said tubular casing a mixture comprising,
      (i) liquid smoke,
      (ii) browning agents, and
      (iii) optionally water;
   (c) allowing said mixture to remain in contact with the interior surface of said tubular casing for at least 5 days; and
   (d) applying a water-in-oil emulsion to the exterior surface of said tubular casing, said water-in-oil emulsion optionally comprising at least one of fungicides and preservatives; and
   (e) optionally shirring and watering the mixture treated casing thereby forming said smoke-impregnated tubular casing.

2. The process of claim 1 wherein said mixture comprises, (i) 10–50% by weight of liquid smoke, (ii) 20–60% by weight of browning agent, and (iii) 0–70% by weight of water, the percentages totaling 100% by weight.

3. The process of claim 1 wherein said mixture comprises (i) 20% by weight of liquid smoke, (ii) 40% by weight of browning agent, and (iii) 40% by weight of water.

4. The process of claim 1 wherein said mixture is allowed to remain in contact with the interior surface of said tubular casing for a period of 5 to 10 days.

5. The process of claim 1 wherein said smoke-impregnated tubular casing is suitable for encasing sausage meat emulsion.

* * * * *